United States Patent [19]

Gasser et al.

[11] 4,389,849

[45] Jun. 28, 1983

[54] STIRLING CYCLE CRYOGENIC COOLER

[76] Inventors: James M. Beggs, Administrator of the National Aeronautics and Space Administration, with respect to an invention of Max G. Gasser, Rockville, Md.; Allan Sherman, Lanham, Md.; Philip A. Studer, Silver Spring, Md.; Alexander Daniels, Briarcliff Manor; Michael P. Goldowsky, Valhalla, both of N.Y.

[21] Appl. No.: 308,204

[22] Filed: Oct. 2, 1981

[51] Int. Cl.³ ............................................. F25B 9/00
[52] U.S. Cl. ........................................ 62/6; 308/10; 310/15; 417/417
[58] Field of Search .................. 62/6; 308/10; 310/15, 310/16, 17; 417/410, 417

[56] References Cited

U.S. PATENT DOCUMENTS

| | | | |
|---|---|---|---|
| 3,031,970 | 5/1962 | Hoblitzelle | 417/417 |
| 3,105,153 | 9/1963 | James, Jr. | 310/15 |
| 3,543,061 | 11/1970 | Wallace | 310/17 |
| 3,552,120 | 1/1971 | Beale | 62/6 |
| 3,736,761 | 6/1973 | Richmon et al. | 62/6 |
| 4,037,886 | 7/1977 | Boden et al. | 308/10 |
| 4,160,924 | 7/1979 | Botts | 310/17 |
| 4,365,942 | 12/1982 | Schmidt | 310/15 |

*Primary Examiner*—Ronald C. Capossela
*Attorney, Agent, or Firm*—John O. Tresansky; John R. Manning; Ronald F. Sandler

[57] ABSTRACT

A long lifetime Stirling cycle cryogenic cooler particularly adapted for space applications comprised of a compressor section (10) centrally aligned end to end with an expansion section (12) and respectively including a reciprocating compressor piston (14) and displacer (16) radially suspended in interconnecting cylindrical housings (18, 20) by active magnetic bearings (26, 28, 30, 32) and having adjacent reduced clearance regions (82, 84, 108) so as to be in non-contacting relationship therewith and wherein one or more of these regions operate as clearance seals. The piston (14) and displacer (16) are reciprocated in their housings (18, 20) by linear drive motors (48, 52) to vary the volume of respectively adjacent compression and expansion spaces (44, 46) which contain a gaseous working fluid and a thermal regenerator (95) to effect Stirling cycle cryogenic cooling. Electrical circuit means (140, 142) are additionally included for energizing the magnetic bearings (26, 28, 30, 32) and for controlling the stroke amplitudes and relative phase angle between the compressor piston (14) and displacer (16) during the cooling cycle.

30 Claims, 9 Drawing Figures

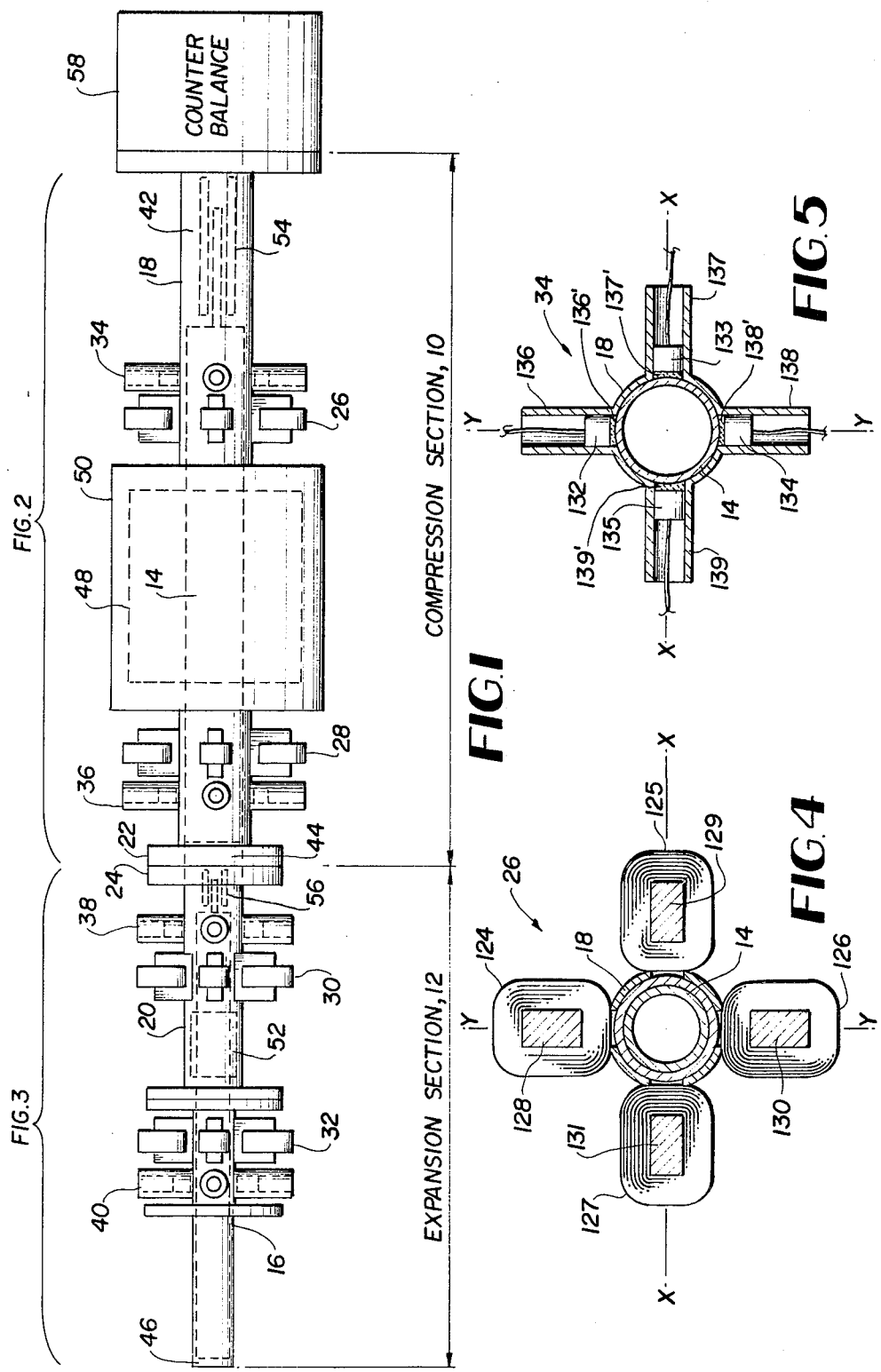

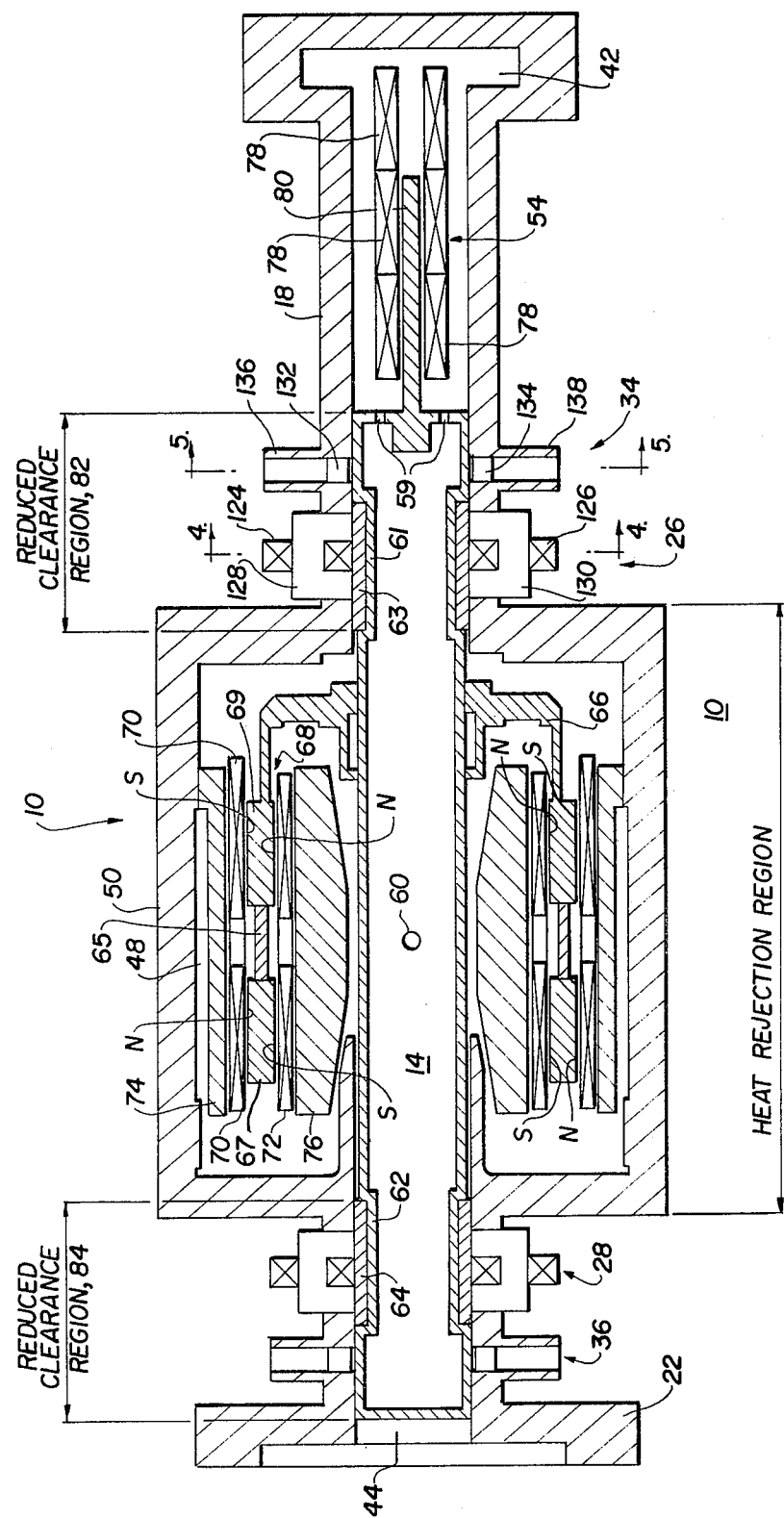

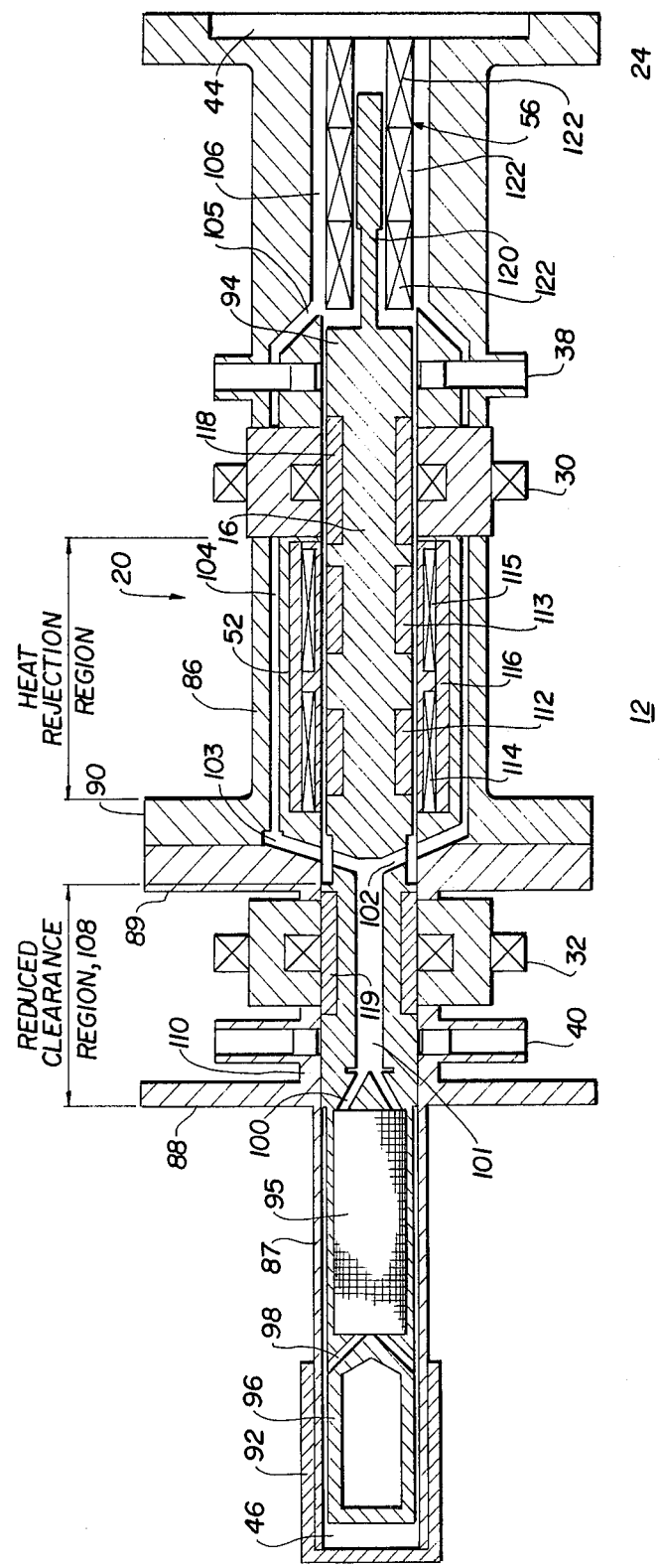

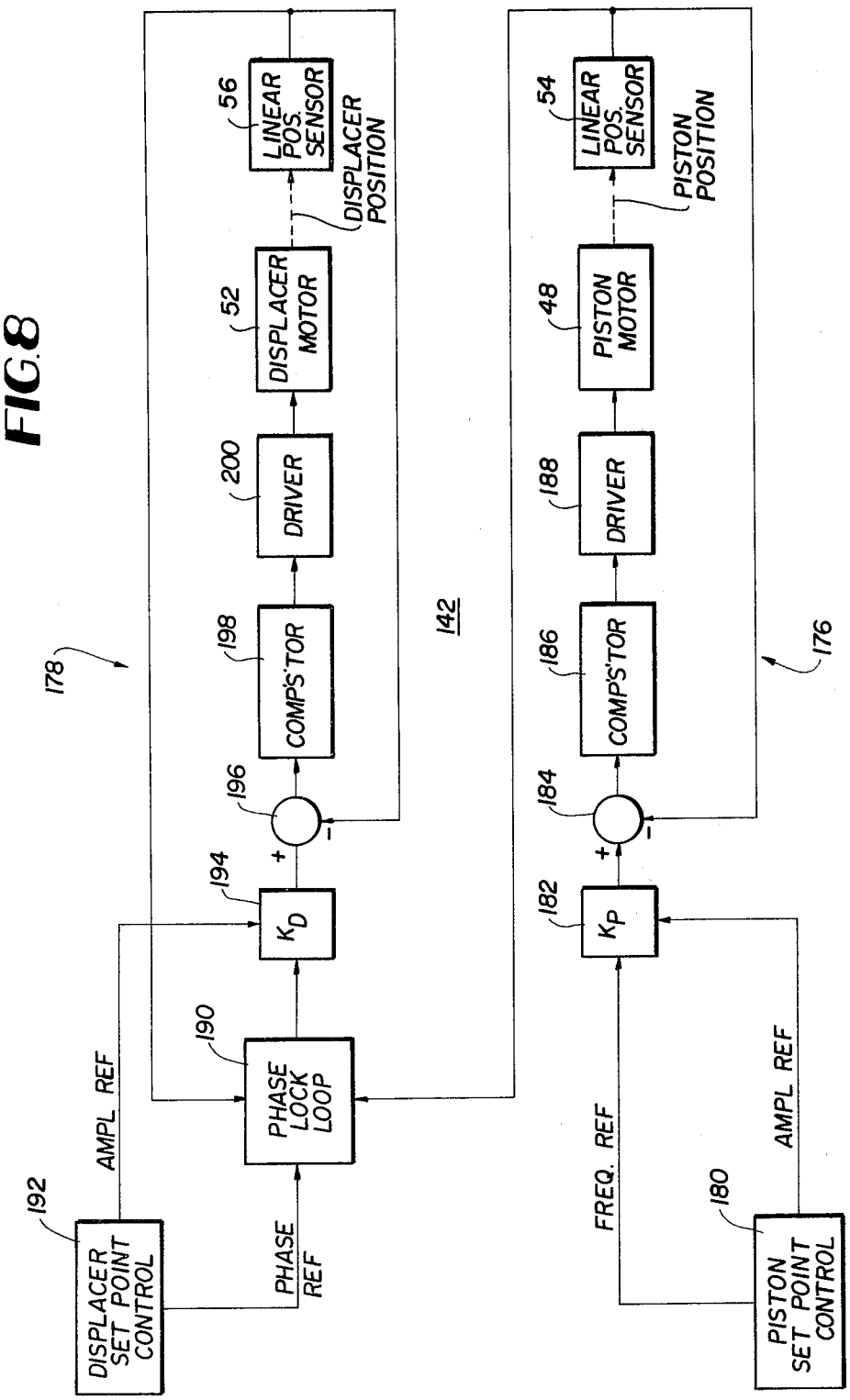

STIRLING CYCLE CRYOGENIC COOLER

ORIGIN OF THE INVENTION

The invention described herein was made by employees of the United States Government as well as in the performance of work under a NASA Contract and is subject to the provisions of Section 305 of the National Aeronautics and Space Act of 1958, Public Law 85-568 (72 Stat. 435; 42 U.S.C. 2457) and accordingly may be manufactured and used by or for the Government for governmental purposes without the payment of any royalties thereon or therefor.

CROSS REFERENCE TO RELATED APPLICATION

This application is related to an application for an invention entitled, "Linear Magnetic Bearings", U.S. Ser. No. 415,960, on Sept. 8, 1982. This application is also assigned to the assignee of this invention.

TECHNICAL FIELD

The invention relates generally to refrigeration apparatus and more particularly to cryogenic cooling apparatus which operates on the Stirling cycle.

BACKGROUND ART

For many applications and particularly airborne equipment and spacecraft instruments, there is a need for a compact cryogenic cooler capable of reliable operation over an extended period of time. Although there are many such apparatus in existence, they are either subject to wear which requires the servicing and replacement of parts or are extremely complicated and expensive to construct. The Stirling cycle has been successfully employed in many kinds of refrigeration apparatus; however, such apparatus has necessarily included complicated drive mechanisms, rubbing seals and bearings which require lubrication. The complicated drive mechanisms result in increased failure modes while the rubbing seals, bearings and lubricants, in addition to the wear, produce internal contamination which contamination is also aggravated by the use of organic and other outgassing materials within the system.

It is desirable, therefore, to be able to provide a closed cycle machine with moving parts that will reliably run for an extremely long length of time, for example, three to five years, while unattended. To date, no previous approach has been able to provide a long lifetime space-borne cooler system that will reliably run for billions of cycles without failure.

STATEMENT OF THE INVENTION

It is therefore an object of this invention to provide a reciprocating type of machine capable of operating reliably over a relatively long lifetime without maintenance.

Another object of the invention is to provide a cryogenic cooler particularly adapted for a spacecraft operating environment.

Still another object of the invention is to provide a cryogenic cooler operating on the Stirling cycle which is relatively simple in mechanical design.

Still a further object of the invention is to provide a long life Stirling cycle cryogenic cooler which eliminates the frictional wear normally associated with moving parts.

Yet another object of the invention is to provide a Stirling cycle cryogenic cooler particularly adapted for space applications and which is substantially free of contamination from lubricants frictional wear and outgassing.

A still further object of the invention is to provide a high efficiency electronically driven mechanical cooling apparatus.

These and other objects are achieved in accordance with a machine which includes a reciprocating piston radially suspended by magnetic bearing means and located within a cylinder with clearance seals. Specifically a cryogenic cooling system is provided with an elongated compressor section and an elongated expansion section. The sections respectively have a longitudinally movable compressor piston and displacer which are radially suspended for axial movement by means of non-contact linear magnetic bearings in generally cylindrical housings which are coupled end to end along a common center line and due to the accurate radial positioning achieved thereby, non-contacting clearance seal regions are located adjacent each magnetic bearing to provide a long lifetime operational capability with little or no contamination of a working fluid occurring due to frictional wear or lubrication or by having organic compounds in contact with the working fluid. Linear drive motors couple the piston and displacer for moving these elements in a Stirling operating cycle utilizing a working fluid. Electrical control circuitry is included for energizing the magnetic bearings and for controlling the stroke amplitudes and phase angle between the piston and displacer member utilizing feedback signals generated by linear position sensors coupled to the piston and displacement member.

The foregoing as well as other objects, features and advantages of the invention will become more apparent from the following description taken in conjunction with the following drawings.

BRIEF DESCRIPTION OF THE DRAWINGS

FIG. 1 is a mechanical schematic diagram illustrative of the preferred embodiment of the invention;

FIG. 2 is a central longitudinal section illustrative of the details of the compressor section of the embodiment shown in FIG. 1;

FIG. 3 is a central longitudinal sectional drawing illustrative of the details of the expansion section of the embodiment shown in FIG. 1;

FIG. 4 is a cross sectional view of the embodiment of the compressor section shown in FIG. 2 taken along the lines 4—4 thereof and being illustrative of one of a plurality of like active magnetic bearing assemblies which form part of the invention;

FIG. 5 is a cross sectional view taken on the lines 5—5 of FIG. 2 and being illustrative of one of a plurality of like radial position sensor assemblies utilized in connection with each magnetic bearing assembly;

FIG. 7 is an electrical block diagram illustrative of the electrical circuitry for energizing one axis of each magnetic bearing assembly;

FIG. 8 is an electrical block diagram illustrative of the electrical circuitry for controlling the piston drive motor and displacer drive motor located in the compressor and expansion section, respectively; and FIG. 9 is an electrical block diagram of the electrical circuitry for driving one of the motors shown in FIG. 8.

DETAILED DESCRIPTION OF THE INVENTION

Figure 6:
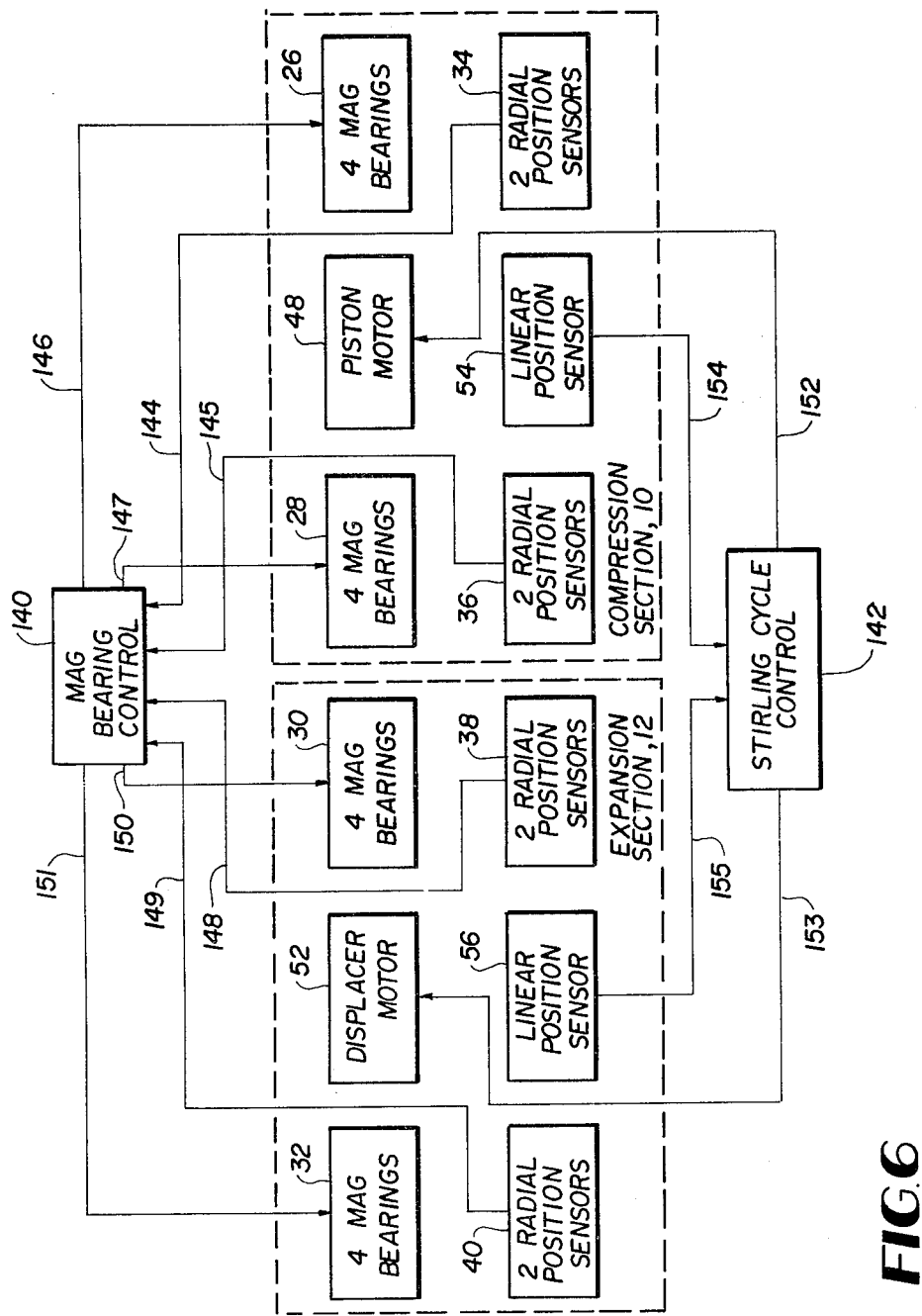
FIG. 6 is an electrical block diagram broadly illustrative of the control circuitry for operating the embodiment of the invention shown in FIG. 1.

Referring now to the drawings wherein like reference numerals refer to like parts throughout, FIG. 1 discloses in schematic form a single expansion Stirling cycle cryogenic cooler with non-contacting linear magnetic bearing suspension. The system is comprised of interconnected mechanical subassemblies 10 and 12 which make up a compression section and an expansion section and which respectively include a linearly reciprocating piston 14 and displacer 16 which are generally circular in cross section and being located in elongated cylindrical sleeve type housings 18 and 20 which are joined together end to end along a common central longitudinal axis by adjoining flanges 22 and 24. This longitudinal arrangement allows for simplified balancing, e.g. a single balancing mechanism.

Both the piston 14 and the displacer 16 contain ferromagnetic, i.e. magnetizable material, and are held in magnetic suspension within the respective cylindrical housings 18 and 20 by pairs of mutually separated active magnetic bearing assemblies 26 and 28 and 30 and 32, each being comprised of four orthogonally positioned electromagnets, as shown in FIG. 4. The magnetic bearing assemblies are selectively energized in accordance with the outputs of adjacently located radial position sensor assemblies 34, 36, 38 and 40, each of which is comprised of at least two but preferably four sensor probes, as shown in FIG. 5, mounted at right angles with respect to one another so as to sense any movement of the respective elements 14 and 16 along mutually perpendicular axes. The details of this type of magnetic bearing and position sensor are disclosed in the aforementioned cross related application, U.S. Ser. No. 415,960, entitled, "Linear Magnetic Bearings", and are herein meant to be incorporated by reference. The magnetic bearing assemblies 26, 28, 30 and 32 are adapted to provide a means for allowing linear movement of the piston 14 and the displacer member 16 without contact with the inner side walls of the respective cylindrical housings 18 and 20, a feature which obviates any mechanical wear heretofore encountered by the frictional contact of such members with their bearing surfaces. While the piston 14 and displacer 16 are free to rotate, they are not intended to do so. Additionally, while no springs are associated with the displacer 16, the piston 14 is adapted to operate with a gas spring provided by the pressure wave in a variable volume compression space 44 located at the inner end of the compressor housing 18. The housings 18 and 20 are hermetically sealed and are filled with a working fluid under pressure through a fill valve (not shown). The fluid typically comprises helium, but may be other suitable gaseous media such as neon, hydrogen or combinations of the three. The variable volume compression space 44 is located at the flange 22. The displacer housing 20, on the other hand, includes a variable volume expansion space 46 at the outer end thereof. Both spaces 44 and 46 are interconnected by passages and a regenerator, not shown, is included for effecting a Stirling cooling cycle as will be described.

The piston 14 is connected to and linearly reciprocated by a linear drive motor 48 located between the magnetic bearing assemblies 26 and 28 in an enlarged housing section 50 while the displacer 16 is driven back and forth in its cylindrical displacer housing 20 by a linear drive motor 52 located in the housing 20 between the magnetic bearing assemblies 30 and 32. The ends of the piston 14 and the displacer 16 are coupled to respective linear position sensors 54 and 56 which typically comprise linear variable differential transformers that are adapted to provide electrical output signals in response to the axial position of the elements 14 and 16 within the respective cylindrical housings 18 and 20. The compressor section linear motor 48 and the displacer section linear motor 52 are driven in response to the sensed outputs of the linear position sensors 54 and 56 whereupon the piston 14 and the displacer 16 are made to reciprocate substantially sinusoidally in a proper sequence for approximating an ideal Stirling cycle of operation. The piston 14, moreover, acts against the working fluid in space 44 and is driven at its resonant frequency to minimize the power required to drive the apparatus. In order to minimize vibration which occurs due to the relative movement of the two elements 14 and 16, a mechanical balancing device 58 is attached to the outer end of the housing 18 which in its simplest form is comprised of a spring suspended oscillating counterweight on the same longitudinal axis as the compression piston 14 and displacer 16. When desirable, other types of balancing means may be employed.

Considering now the compressor section 10 in further detail, reference is made to FIG. 2 wherein the piston 14 is shown comprised of an elongated hollow metallic body member having one or more vent holes 60 which communicate with the interior of the enlarged motor housing section 50. The purpose of the vent is to equalize the internal pressure between the piston 14 and housing section 50. Similar vent holes 59 are located in the outer end of the piston 14 to reduce or substantially eliminate pressure fluctuations in the space 42. The piston 14 has a pair of constricted regions 61 and 62 fitted with flush mounted metal rings 63 and 64 underlying the magnetic bearings 26 and 28 for providing localized regions of increased magnetism for increasing the magnetic suspension force. The rings 63 and 64 extend axially beyond the magnetic bearings 26 and 28 a sufficient axial length in order to provide a magnetic path throughout the complete stroke of the piston 14. A yolk type structure 66 is attached to the outer surface of the piston 14 which terminates in a cylindrical permanent magnet armature 68, comprising two radially magnetized permanent magnet rings 67 and 69 which are separated by a cylindrical non-magnetic member 65 which is constrained to move linearly between two pairs of cylindrical motor coils 70 and 72. In order to prevent outgassing from the elements 68, 70 and 72, they are sealed in respective metallic cans, not shown. The pairs of coils 70 and 72 located interiorally of cylindrical pole pieces 74 and 76 form an inner or outer stator thereby.

The linear position sensor 54 for the piston 14 is shown located in the region 42 and being comprised of plural windings 78 through which an elongated metallic core member 80 passes without contact, the core member being attached to the outer end of the hollow piston 14 adjacent the vents 59. The internal regions 82 and 84 between the inner surface of the cylindrical housing 18 and the piston 14 at the location of the bearing assemblies 26 and 28 comprise non-contacting clearance regions, one or both of which may function as seals and which comprise regions of reduced radial clearance (nominally 0.002 cm.) from the inner wall of the cylindrical housing 18 sufficient to eliminate any rubbing surfaces therebetween while permitting an acceptable amount of gas blow-by to occur. Clearance regions 82 and 84 are utilized because the magnetic bearing assemblies 26 and 28 located thereat act to centrally locate the piston 14 with a high degree of accuracy in the bore of the piston housing 18. Such a structure described with respect to FIG. 2 provides a minimum of outgassing due to the fact that only nonporous metal and inorganic materials come in contact with the working fluid. Because of the non-contacting clearance regions, little or no particle contamination occurs. It should be pointed out that waste heat from the motor coils is conducted by the motor housing 50 and heat from the housing is carried away by a cooling jacket, not shown.

With respect to the mechanical details of the expansion section 12, reference is now made to FIG. 3. There the displacer 16 is shown comprising an elongated piston-like cylinder located in a generally cylindrical housing 20. Housing 20 consists of an enlarged inner portion 86 which additionally interfaces with a cooling jacket, not shown, for waste heat rejection and a cantilevered relatively thinner outer portion 87 having an ambient temperature flange 88 and a coupling flange 89 which connects to the flange 90 of the inner portion 86. The far end of the outer end portion terminates in a heavy copper cap 92. The displacer 16 includes an inner body portion 94, an intermediate regenerator 95 comprised of a screen matrix of phosphor-bronze or other suitable regenerator material, and a hollow outer end portion 96 which is evacuated. The expansion space 46 is shown consisting of the space between the outer end portion 96 and the interior of the outer portion 87 of the cylindrical housing 20. The working fluid is adapted to flow from the expansion space 46 around the end portion 96 and through the regenerator 95 by means of a passage 98. From the regenerator 95 the working fluid passes through the passages 100, 101, and 102 in the inner body portion 94 and then to the passages 103, 104, 105 and 106 in the inner housing portion 86 where heat transfer takes place and where it then by-passes the linear drive motor 52 and flows around the rear magnetic bearing assembly 30, the radial position sensor assembly 38 and the linear position sensor 56 and into the piston compression space 44 at the location of the connecting flange 24. A non-contacting reduced clearance region 108 which acts as a seal is provided at the location of the outer magnetic bearing assembly 32 and between flanges 88 and 89. As with the clearance regions 82 and 84, shown in FIG. 2, the seal region 108 comprises a region of reduced radial clearance (0.002 cm.) between the displacer 16 and inner side wall of the housing section 110 and except for the acceptable blow-by, causes the working fluid to flow through the passages 100, 101 and 102.

The displacer drive motor 52 is also of the moving magnet type but is of a different design from the piston drive motor 48 (FIG. 2). The linear drive motor 52 is comprised of two annular permanent magnets 112 and 113 embedded in the inner body portion 94 of the displacer 16 adjacent respective cylindrical motor coils 114 and 115 which are sealed in metal cans, not shown, to prevent outgassing products from reaching the working fluid. A common pole piece 116 surrounds the coils 114 and 115. The displacer body portion 94, moreover, also includes a pair of ferromagnetic rings 118 and 119 which are formed in recesses at the location of the magnetic bearing assemblies 30 and 32 for enhancing magnetic coupling between the bearings and the displacer 16. Finally with respect to the linear position sensor 56 for the drive motor 52, it also comprises a linear variable differential transformer including an elongated core member 120 which is adapted to move axially inside cylindrical coils 122 without physical contact.

Referring now to FIGS. 4 and 5, these figures are intended to illustrate one magnetic bearing assembly 26 of the four identical magnetic bearing assemblies 26, 28, 30 and 32 and one radial position sensor assembly 34 of the four identical sensor assemblies 34, 36, 38 and 40. The magnetic bearing assembly 26 as shown in FIG. 4 is comprised of four electromagnets including coils 124, 125, 126 and 127 wound around respective pole pieces 128, 129, 130 and 131 which as illustrated in FIG. 2, are U-shaped. The four electromagnets furthermore are orthogonally mounted around the cylindrical housing 18 which contains the compressor piston 14, with sections of magnetic material under each coil. The electromagnets operate as opposing pairs of electromagnets as fully described in the aforementioned cross referenced related application, U.S. Ser. No. 415,960 to provide attractive forces on the piston 14 along mutually perpendicular (X-Y) axes in response to the sensed position of the piston 14 measured along the same X-Y axes by the position sensor assembly 34 shown in FIG. 5. There the sensor assembly 34 is shown comprised of four radial position sensors 132, 133, 134 and 135, typically eddy-current sensors, located in orthogonally oriented cylindrical tubes 136, 137, 138 and 139 radially extending from the body 18. The tubes are hermetically sealed from the working fluid by means of four ceramic windows 136', 137', 138' and 139'. The sensors are normally placed immediately adjacent to said windows.

In operation, the sensors 132, 133, 134 and 135, being located 90° apart around the piston 14 sense the piston's radial position in the housing 18 and provide respective electrical output signals which are used to control the electrical power applied to the four electromagnets of the bearing assembly 26. Since the bearing assembly 26 operates in the attraction mode, if the piston 14 should go to one side, sensors 132, 133, 134 and 135 preferably operate in a differential mode to cause power to be applied to the electromagnet on the opposite side with the result that the piston 14 would be pulled back into the centered position. This same type of operation applies to the centering of the displacer 16.

With respect to the operation of the Stirling cycle, it is provided by the invention in the following manner. As noted, the piston 14 and the displacer 16 reciprocate in their respective housings or sleeves 18 and 20 in accordance with electrical currents applied to the linear drive motors 48 and 52. In the ideal Stirling cycle, four heat-transfer processes take place, the first of which is isothermal compression. There heat transfers from a working fluid to an external heat sink at ambient temperature. The next process is one of heat transfer at constant volume from the working fluid to a regenerative matrix. The third process comprises heat transfer in an isothermal expansion of the working fluid from an external source at the refrigerated temperature, and finally a process of heat transfer at constant volume to the working fluid from the regenerative matrix takes place.

With respect to the embodiment of the subject invention shown in FIGS. 1, 2 and 3, the ideal Stirling cycle approximated thereby can be explained by assuming first that the compression section piston 14 is at its outer dead point, meaning that it has moved a maximum distance away from the compression space 44 while the displacer 16 has moved to its outer dead point which is its maximum travel toward the expansion space 46, thereby providing a maximum volume in the compression space 44 and with all the working fluid being substantially located thereat and at ambient temperature. During the compression process, the piston 14 moves towards the displacer 16 which remains stationary, whereupon the working fluid is compressed in the compression space 44, at which time the pressure in the region increases. The temperature, however, is maintained constant by abstracting heat from the compression space 44. Next the displacer member 16 moves away from the expansion space 46 while the working fluid maintains a constant volume, whereupon the working fluid is transferred from the compression space 44 through the porous metallic matrix of the regenerator 95 to the expansion space 46. Passing through the regenerator 95 the working fluid is cooled by heat transfer to the matrix and emerges from the regenerator 95 to the expansion space 46 at a lower temperature. A decrease in temperature passing through the matrix at constant volume causes a decrease in pressure. Following this, the piston 14 moves to its outer dead point, i.e. to its maximum distance away from the compression space 44. As the expansion proceeds, pressure in the region of the expansion space 46 decreases as the volume increases and temperature remains constant as heat is extracted from the cold end cap 92 (FIG. 3). This is the useful refrigeration portion of the cycle and cryogenic cooling is accomplished. Finally, the displacer 16 moves to transfer the working fluid at constant volume back through the regenerator 95 from the expansion space 46 to the compression space 44. In passing through the matrix, heat is transferred from the matrix so that the working fluid increases in temperature and arrives at a relatively higher temperature back into the compression space 44.

FIGS. 6 through 9 are illustrative block diagrams disclosing the electrical circuitry utilized for centering the piston 14 and the displacer member 16 in their respective cylindrical sleeve type housings 18 and 20 as well as controlling the length of stroke, i.e. linear displacement as well as controlling the phase angle between the piston 14 and the displacer member 16 which is substantially 90° for implementing a Stirling cycle. Accordingly, in FIG. 6 reference numbers 140 and 142 designate two electrical sub-systems for maintaining axial alignment of the piston and displacer through electromagnetic bearing control and providing control of the Stirling refrigeration cycle. As shown, the magnetic bearing control circuitry 140 has inputs 144 and 145 coming from the two radial position sensors 34 and 36 of the compression section 10 and two outputs 146 and 147 for controlling energization of the magnetic bearings 26 and 28. There are likewise two inputs 148 and 149 to the bearing control circuitry 140 from the radial position sensors 38 and 40, with two outputs 150 and 151 then being coupled to the magnetic bearings 30 and 32 of the expansion section 12. The Stirling cycle control circuitry 142 has respective outputs 152 and 153 going to the piston motor 48 and the displacer motor 52 while receiving input information as to their respective linear movement from the linear position sensors 54 and 56 by the inputs 154 and 155.

Figures 7, 9:
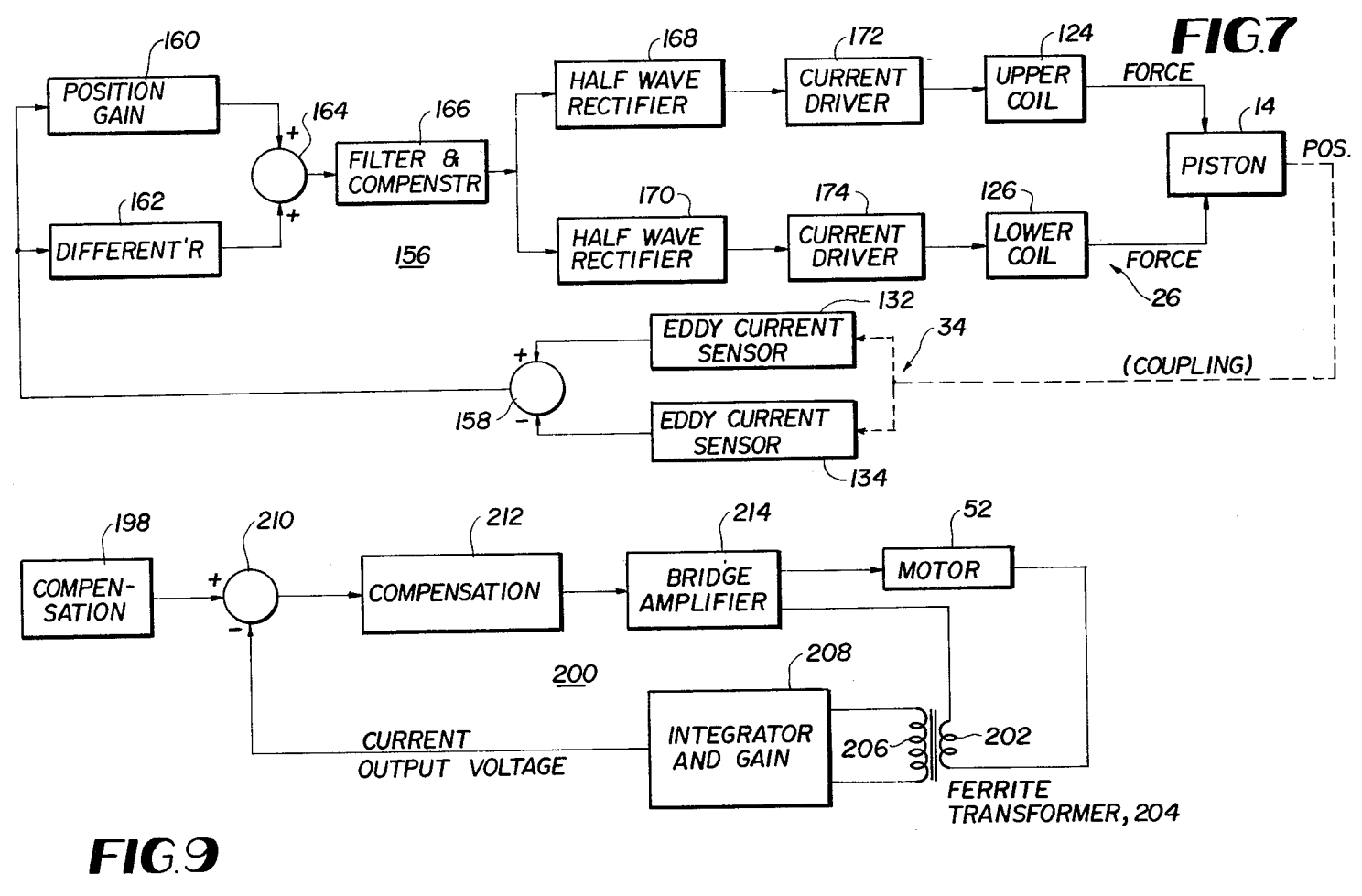

With respect to the bearing control circuitry, FIG. 7 shows the details in block diagram form of one typical circuit 156 which is utilized to control one electromagnetic bearing assembly, for example, bearing assembly 26 shown in FIG. 1 along one axis, the Y axis, in response to the output of the sensor 132 shown in FIG. 5. The circuitry for the X axis of the same bearing assembly 26 is identical and accordingly pairs of like circuits are utilized in connection with the other three magnetic bearings 28, 30 and 32. The block diagram in FIG. 7 shows two opposing sensors 132 and 134 of the radial position sensor assembly 34 being coupled to the piston 14. The outputs therefrom are subtracted from one another in a summing circuit 158 to provide a differential mode of control. The output of the summer 158 is applied simultaneously to a gain control circuit 160 and a differentiator circuit 162 each of which provides signals for controlling bearing stiffness and damping. The outputs of the gain control circuit 160 and differentiator 162 are added together in a summing circuit 164 whereupon the added output signal is fed to a filter and compensator circuit 166 for removing high frequency noise and to provide a predetermined necessary lag compensation to stabilize the closed loop response. The compensated signal is fed to two half-wave rectifiers 168 and 170 which are coupled to respective current driver circuits 172 and 174 which feed the coils 124 and 126 of the upper and lower electromagnets as shown in FIG. 4. The current driver circuits 172 and 174 are used to nullify the effects of suspension coil inductance so that a fast response can be obtained. Accordingly, when the output signal from the compensator circuitry 166 is positive, one of the coils, e.g. coil 124 is energized, whereas when the signal is negative, the opposing coil 126 is energized. The resulting magnetic forces act upon the piston 14 and a continuous sensing and energization of the magnetic bearing occurs in a closed control loop. Accordingly, the piston 14 will be levitated and controlled so as to be coincident with its central longitudinal axis. When desirable, a low DC coil current is maintained by means, not shown, through each electromagnet coil 124, 125, 126 and 127 for enabling an adjustable bearing stiffness to be obtained at the center position. The levitation and centering functions of the magnetic bearings are independent of the axial motion of the piston 14 and displacer 16 and are maintained throughout turn-on and turn-off of the linear drive motors 48 and 52 to prevent contact of the piston 14 and displacer 16 with their respective housings.

In summation, the relationship between the dimensions of the reduced clearance regions 82, 84 and 108 and their axial length as well as the degree of centering of the piston 14 and displacer 16 are integrally interrelated in terms of providing an effective seal without excessive leakage and drag which would otherwise be provided by an excessively large clearance. Furthermore these relationships are non-linear.

Turning attention now to FIG. 8 and the cooler control circuitry 142, the linear drive motor 48 for the piston 14 and the linear drive motor 52 for the displacer 16 has its own closed loop position control circuit 176 and 178. Considering the piston control loop 176, the desired cooler reciprocating frequency and piston amplitude are set as reference points by a set point control unit 180. Signals corresponding to the desired frequency and amplitude are applied as reference inputs to a gain ($K_p$) producing circuit 182 where they are combined and fed to a summing circuit 184 at which circuit the piston's position as sensed by the linear position sensor 54 is fed back and compared with the combined reference. The resulting error signal from the summing circuit 184 is fed to a compensator circuit 186 which acts to correct for phase shifts associated with the linear sensor 54 which, as noted above, comprises a linear variable differential transformer and the motor electrodynamics so that a stable control system results. The output of the compensator 186 is fed to a power amplifier or driver circuit 188 which operates to drive the piston motor 48.

With respect to the displacer control loop 178, the position of the piston 14 as sensed by the linear position sensor 54 is also fed back as one input to a phase-lock loop 190 which also receives an input from the linear displacement sensor 56 for the displacer 16, whereupon a relative phase of the displacer 16 with respect to the piston 14 is obtained and compared to a desired reference phase as provided by a displacer set point control unit 192. The output of the phase-lock loop comprises a signal which is adapted to increase or decrease in frequency so as to force the displacer 16 to either speed up or slow down, respectively. The desired displacer amplitude is combined with the output of the phase-lock loop in a gain ($K_D$) producing circuit 194 where it is fed to a summing circuit 196 which acts as a comparator for providing a difference signal between the output of the circuit 194 and a feedback signal from the linear position sensor 56. The summing circuit 196 provides an error signal which is fed to a compensator circuit 198 substantially identical to the compensator circuit 186 whereupon a control signal is fed to a driver circuit 200 which powers the displacer motor 52. In operation, the phase-lock loop 190 forces the displacer 16 to track the piston 14 at a constant phase angle of, for example 90° and integrates the displacer's phase error to eliminate steady state tracking errors.

The driver circuits 188 and 200 comprise identical current feedback closed loop regulators which are designed to provide a relatively quick force response for the piston linear drive motor 48 and the displacer member linear drive motor 52 in spite of motor inductance, meaning that the desired motor current at each instant of time is the controlled parameter. Considering FIG. 9 which is illustrative of one motor drive circuit 188, motor current is sensed by a low resistance primary winding 202 of a step-up ferrite transformer 204 utilized for low distortion and in which the voltage across the secondary winding 206 provides a signal proportional to the derivative of motor current. The secondary winding 206 is fed to an integrator and gain producing circuit 208 whereupon a signal proportional to motor current is obtained. The current output voltage signal from the circuit 208 is compared with a current reference voltage signal from the compensation circuit 186 (FIG. 8) at a summing circuit 210 whereupon an error signal is produced which is fed to a second compensator 212 to provide loop stability. The output of the compensator circuit 212 is coupled to a bridge type amplifier 214 which in turn powers the motor 52. The reference signal from the compensator circuit 198 is sinusoidal and accordingly the motor current is forced to track sinusoidally. Thus the motor force becomes sinusoidal and substantially sinusoidal movement of the piston 14 is provided as desired for effecting a Stirling cooling cycle. The same sinusoidal movement is required for and is provided for the displacer 16 by the driver circuit 200.

Thus what has been shown and described is a long lifetime cryogenic cooler comprised of non-contacting magnetic bearings and non-contacting clearance regions over a length which permits a non-wearing piston and displacer to be reciprocated in interconnected sleeves containing a working fluid to effect a Stirling cycle of refrigeration.

Whereas the invention has been shown and described with respect to a preferred embodiment, it should be understood that modifications may be made and equivalents substituted without departing from the spirit and scope of the invention. For example, the amplitude of displacement and the phase relationship between the piston and displacer may be varied during operation and these factors, moreover, may be remotely controlled or programmed by a microprocessor. Accordingly, all modifications, changes and alterations coming within the spirit and scope of the invention as defined in the appended claims are herein meant to be included.

We claim:

1. Apparatus comprising in combination:
   a reciprocally movable body (14, 16) located in a body housing (18, 20) containing a working fluid;
   drive motor means (48, 52) coupled to said body (14, 16) for effecting reciprocation of said body (14, 16) within said housing (18, 20) to selectivety compress and expand said working fluid;
   non-contacting bearing means (26, 28, 30, 32) on said housing (18, 20) and being operable to center said body (14, 16) in said housing;
   a non-contacting reduced clearance region (82, 84, 108) between said body and housing for restricting undesired flow of said working fluid around said body (14, 16);
   said non-contacting bearing means (26, 28, 30, 32) and said non-contacting reduced clearance region (82, 84, 108) being operable to eliminate physical contact between said body (14, 16) and said housing (18, 20).

2. The apparatus as defined by claim 1 wherein said reciprocal body (14, 16) comprises a piston type member having an outer surface of a predetermined shape and wherein said body housing (18, 20) has an inner surface generally conforming to the outer surface of said piston type member.

3. The apparatus as defined by claim 1 wherein said non-contacting bearing means (26, 28, 30, 32) comprises magnetic bearing means.

4. The apparatus as defined by claim 1 wherein said non-contacting reduced clearance region (82, 84, 108) comprises a clearance seal formed by the clearance between said body (14, 16) to said housing (18, 20).

5. Cooling apparatus, comprising in combination:
   a reciprocally operable compressor piston (14) located in a generally cylindrical compressor section housing (18) and including a working fluid compression space (44) at one end thereof, said compression space being variable in accordance with the position of the piston in said housing;
   a reciprocally operable displacer (16) located in a generally cylindrical expansion section housing (20) and including a working fluid expansion space (46) at one end thereof, said expansion space being variable in accordance with the position of said displacer;
   said housings (18, 20) being interconnected and including a working fluid and having means (95, 98, 100, 101, 102, 103, 104, 105, 106) for the flow of working fluid between said compression space (44) and said expansion space (46);

drive motor means (48, 52) coupled to said compressor piston (14) and said displacer (16) and being operable to provide mutual reciprocation of said piston and said displacer in a controlled phase relationship to effect a predetermined cooling cycle by the compression and expansion of said working fluid;

non-contacting bearing means (26, 28, 30, 32) located on said housings (18, 20) and being operable to radially center said piston (14) and said displacer (16) in their respective said housings; and non-contacting seal means (84, 108) for restricting undesired flow of said working fluid around said piston (14) and said displacer (16);

said non-contacting bearing means and said non-contacting seal means being operable to eliminate physical contact between said piston (14) and its respective housing (18) and said displacer (16) and its respective housing (20), thereby providing long operational life and non-contamination of the working fluid.

6. The cooling apparatus as defined by claim 5 wherein said non-contacting bearing means (26, 28, 30, 32) comprises magnetic bearing means.

7. The cooling apparatus as defined by claim 5 wherein said non-contacting seal means (84, 108) is formed by the clearance between said piston (14) and said displacer (16) to their respective said housings.

8. The cooling apparatus as defined by claim 5 wherein said compressor section housing (18) and said expansion section housing (20) are connected in an end to end relationship along a common central longitudinal axis.

9. The cooling apparatus as defined by claim 5 wherein said working fluid is a gas selected from the group consisting essentially of helium, neon, and hydrogen.

10. The cooling apparatus as defined by claim 5 wherein said working fluid is helium.

11. The cooling apparatus as defined in claim 5 wherein said drive motor means (48, 52) operates said piston (14) and displacer (16) in a Stirling cycle.

12. The cooling apparatus as defined by claim 9 wherein said drive motor means (48, 52) comprise linear drive motors.

13. The cooling apparatus as defined by claim 5 wherein said drive motor means (48, 52) comprises two drive motors, each driving said piston and displacer independently.

14. The cooling apparatus as defined by claim 5 wherein the controlled phase and amplitude relationship between said piston (14) and displacer (16) includes electrical control.

15. The cooling apparatus as defined by claim 5 wherein said non-contacting bearing means (26, 28, 30, 32) comprises respective pairs of active magnetic bearing assemblies (26, 28 and 30, 32) located in spaced apart relationship toward each end of said piston (14) and displacer (16).

16. The cooling apparatus as defined by claim 15 wherein said piston (14) and displacer (16) contain magnetizable material and wherein each magnetic bearing assembly (26, 28, 30, 32) is comprised of a set of at least four electromagnets (124, 125, 126, 127) orthogonally located around the respective housing (18, 20) and operated to provide attractive forces on said piston (14) and said displacer (16) along mutually perpendicular axes (X-Y) position sensor means (34, 36, 38, 40) located adjacent each set of electromagnets and being operable to detect an off-center condition of the piston (14) and displacer (16) and operable to provide output signals in accordance with the conditions sensed, and electrical circuit means (140) coupled to said set of electromagnetics and being operable to selectively energize each electromagnet in response to said output signal to cause said piston (14) and displacer (16) to be centered in said respective housings (18, 20).

17. The cooling apparatus as defined by claim 16 wherein said position sensor means (34, 36, 38, 40) comprises a set of at least two sensors (132, 133) orthogonally located around the respective housing (18, 20) in substantial alignment with a respective set of electromagnets (124, 125) and being operable to sense an off center condition of the piston (14) or displacer (16) along said mutually perpendicular X-Y axes.

18. The cooling apparatus as defined by claim 16 wherein said position sensor means (34, 36, 38, 40) comprises a set of sensors (132, 133, 134, 135) orthogonally located around the respective housing (18, 20) in substantial alignment with a respective set of electromagnets (124, 125, 126, 127) and being operable to sense an off center condition of said piston (14) and displacer (16) along said mutually perpendicular X-Y axes.

19. The cooling apparatus as defined by claim 15 and wherein said non-contacting seal means comprises a clearance seal (84) located in proximity to said compression space (44) and a clearance seal (108) located in proximity to said expansion space (46).

20. The cooling apparatus as defined by claim 15 wherein said drive motor means comprises a first linear drive motor (48) located intermediate the magnetic bearing assemblies (26, 28) located toward each end of said piston (14) and a second linear drive motor (52) located intermediate the magnetic bearing assemblies (30, 32) located toward each end of said displacer (16).

21. The cooling apparatus as defined by claim 20 and additionally including motor control circuit means (142) coupled to said first and second linear drive motors (48, 52) to move said piston (14) and said displacer (16) in a mutually reciprocal motion to effect a Stirling cycle.

22. The cooling apparatus as defined by claim 21 wherein said control circuit means (142) additionally include means (54, 56) for sensing the linear displacement of said piston (14) and said displacer (16) and being operable for generating feedback signals which are utilized by said control circuit for effecting a substantially sinusoidal movement of said piston (14) and said displacer (16).

23. The cooling apparatus as defined by claim 22 wherein said means for sensing linear displacement of said piston (14) and said displacer (16) comprises respective electrical circuit means (78, 80 and 120, 122) located in said compressor section housing (18) and said expansion section housing (20) and being respectively coupled to said piston (14) and said displacer (16).

24. The cooling apparatus as defined by claim 23 wherein said electrical circuit means comprises a first linear differential transformer (78, 80) coupled to said piston (14) and located in said compressor section housing (18) at the other end (42) from said compression space (44) end and a second linear differential transformer (120, 122) coupled to said displacer member (16) and located in said expansion section housing (20) at the other end from said expansion space (46) end.

25. The cooling apparatus as defined by claim 20 wherein said first linear drive motor (48) is comprised of concentric cylindrical stator and armature assemblies (68, 70, 72) located in a portion (50) of said compressor section housing (18), said assemblies being sealed for eliminating contamination of the working fluid, and wherein said piston (14) is substantially hollow and includes at least one opening (60, 59) to said compressor section housing portion (50) to eliminate any pressure differential therebetween.

26. The cooling apparatus as defined by claim 5 wherein the end of the compressor section housing (18) including the compression space (44) is connected to the end of the expansion section housing (20) which is opposite from the end including the expansion space (46).

27. The cooling apparatus as defined by claim 26 wherein the displacer (16) includes an outer end member (96) and intermediate cooling regenerator means (95) located at the expansion space end of said expansion section housing (20) outwardly from said magnetic bearing assemblies (39, 32) and wherein said regenerator means (95) is fluidly coupled with said expansion space (46) and said compression space (44) for operation in a Stirling cycle mode of cooling.

28. The cooling apparatus as defined by claim 27 wherein said expansion section housing (20) includes an end cap (92) at the location of said outer end member (96) for enhancing the cooling of the adjacent vicinity as a result of the expansion of the working fluid in said expansion space (46) during said Stirling cooling cycle.

29. The cooling apparatus as defined by claim 28 wherein said drive motor means (52) connected to said displacer (16) comprises a linear drive motor located intermediate the magnetic bearing assemblies (30, 32) located toward each end of said displacer (16).

30. The cooling apparatus as defined by claim 29 wherein said linear drive motor (52) is comprised of concentric cylindrical armature and stator assemblies (112, 113, 114, 115, 116) located in a portion (86) of said expansion section housing (20).

* * * * *